S. HARVEY.
NUT LOCK.
APPLICATION FILED APR. 22, 1909.
948,855. Patented Feb. 8, 1910.
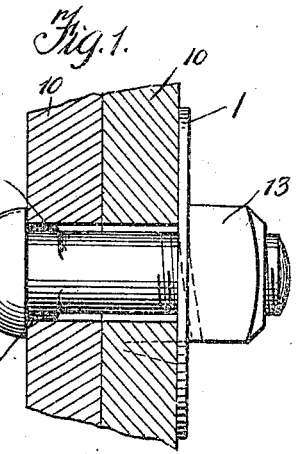
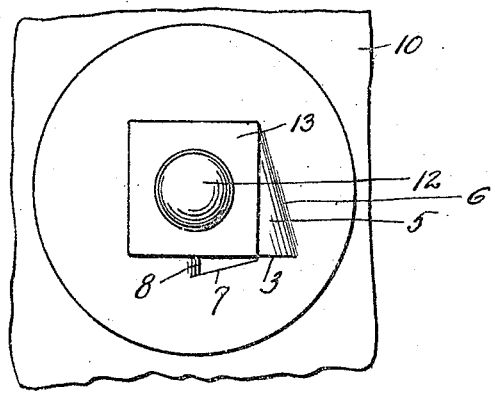
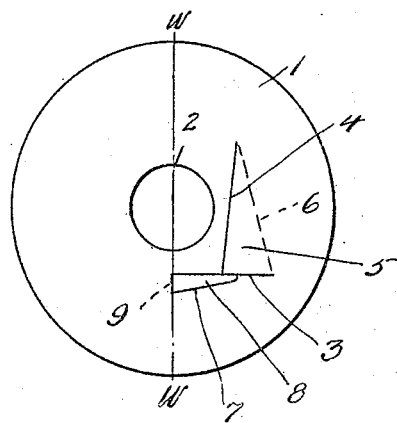
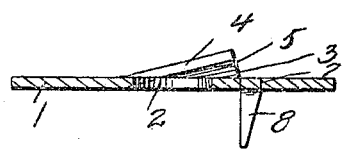
Witnesses
Samuel Payne
K. H. Butler
Inventor
S. HARVEY
By H. C. Evert & Co.
Attorneys

UNITED STATES PATENT OFFICE.

SAMSON HARVEY, OF MANOR STATION, PENNSYLVANIA.

NUT-LOCK.

948,855.  Specification of Letters Patent.  Patented Feb. 8, 1910.

Application filed April 22, 1909. Serial No. 491,438.

*To all whom it may concern:*

Be it known that I, SAMSON HARVEY, a citizen of the United States of America, residing at Manor Station, in the county of Westmoreland and State of Pennsylvania, have invented certain new and useful Improvements in Nut-Locks, of which the following is a specification, reference being had therein to the accompanying drawing.

This invention relates to nut locks, and the object thereof is to provide in a manner as hereinafter set forth a simple and effective means for locking a nut upon a bolt whereby back rotation of the nut will be prevented so that the nut will not become loose.

A further object of the invention is to provide a nut lock which shall be simple, strong, durable and inexpensive and of such construction that it can be easily manipulated to position the locking washer upon the bolt so as to be arranged in locking relation with respect to the nut and furthermore whereby the locking washer can be removed from the bolt without injuring the latter or the nut.

With the foregoing and other objects in view which will more readily appear as the invention is better understood, the invention consists in the novel construction, combination and arrangement of parts hereinafter more specifically set forth and illustrated in the accompanying drawings, which form a part of this specification, wherein is shown the preferred embodiment of the invention, but it is to be understood that changes, variations and modifications can be resorted to which come within the scope of the claim hereunto appended.

In the drawings, Figure 1 is a side elevation of the nut lock, in accordance with this invention, Fig. 2 is a front elevation, Fig. 3 is a front elevation of the locking washer, and Fig. 4 is a cross sectional view of the locking washer.

Referring to the drawings in detail, 1 denotes a locking washer, which is shown of circular contour, but may be of other shape as is obvious, the opening in the washer being indicated by the reference character 2. The washer adjacent to its opening 2 is provided with a slit 3 which projects at right angles with respect to a line extending transversely of the center of the washer and which is indicated by $w$—$w$. The washer is furthermore provided with a slit 4 which extends at an obtuse angle with respect to the slit 3, the slit 4 at one end terminating in the slit 3 at a point intermediate the ends thereof. The slit 4 is of such a length as to project beyond the opening 2. The slit 4 in connection with the right hand end of slit 3 allows for a part of the body portion of the washer 1 to be bent outwardly from said body portion whereby an angle-shaped locking wing 5 is provided. That part of the washer which forms the locking wing 5 is bent outwardly upon the dotted line 6 and the function of said wing 5 will be hereinafter referred to. The washer 1 at that side of the slit 3 opposite to that from which the slit 4 projects is provided with a slit 7 which extends at an obtuse angle with respect to the line $w$—$w$ and terminates in the slit 3 to one side of that point of the slit 3 in which the slit 4 terminates. That part of the material of the body portion of the washer 1 between the slits 3 and 7 is bent rearwardly on the dotted line 9 so as to provide an angle shape locking wing 8. When the angle shape wings 5 and 8 are set up the wing 5 extends from the body portion of the washer in an opposite direction with respect to the direction in which the wing 8 extends. The wing 5 when in normal locking position is disposed at an inclination with respect to the body portion and is adapted to have the elongated edge engage one side of the nut to prevent movement of the nut upon the bolt.

The reference character 10 denotes a pair of plates which are adapted to be clamped together by the nut lock, the plates are provided with openings 11 through which extends the bolt 12. The bolt 12 is provided with a head which abuts against one of the plates and the bolt 12 has its shank projecting from the other plate and is screw-threaded. The washer 1 is adapted to be mounted upon the screw-threaded end of the shank of the bolt and abuts against one of the plates, with the locking wing 8 projecting toward the plate. The wing 8 can be driven into a plate, by either driving the washer toward the plate with a suitable instrument or by screwing the nut 13 upon the threaded end of the bolt. After the nut 13 has been screwed into engagement with the washer 1 and the washer fixed by the engagement of the wing 8 in the plate 10, the part of the body portion of the washer between the slits 4 and 3 is bent outwardly so as to provide the locking wing 5 which engages one side of the nut 13 thereby preventing the nut from screwing backwardly off the bolt 12. The washer 1 is prevented from rotation by the wing 8 engaging in the material 10 whereby the position of the locking wing 5 will not be changed with respect to the nut 13 so there will be no possibility of the nut screwing backwardly off the bolt.

The washer is preferably constructed of malleable metal. This enables the locking wing 5 to project from the body portion of the washer, prior to screwing the nut 13 upon the bolt and in this connection it will be stated that the nut is adapted to ride over the locking wing and as the wing is made of malleable metal it will readily recede and assume its normal position to engage the nut when the wing is released by the nut.

What I claim is:

In a nut lock, a locking washer provided with a slit extending from and at right angles to a line transversely of the washer at the center thereof, said washer further provided with a slit extending from and at an obtuse angle to the right angularly disposed slit, and said washer furthermore provided with a slit extending from and at an obtuse angle to said line and terminating in said right-angularly disposed slit at a point in proximity to the junction of that slit which extends at an obtuse angle with the right angularly disposed slit, said first two mentioned slits providing means whereby an outwardly projecting angle-shaped locking wing can be formed from the body-portion of the washer for engagement with a nut to prevent the turning thereof and said first mentioned slit and said last mentioned obtuse angularly-disposed slit providing means whereby a rearwardly projecting angle-shaped locking wing can be formed, the base of said last mentioned locking wing being positioned at said line, said last mentioned locking wing in normal position disposed at right angles with respect to the body-portion and adapted to enter the material against which the washer is positioned to prevent movement of the washer and said first mentioned locking wing in normal position disposed at an inclination with respect to the body-portion and adapted to have its elongated edge engage one side of a nut to prevent movement thereof on a bolt.

In testimony whereof I affix my signature in the presence of two witnesses.

SAMSON HARVEY.

Witnesses:
H. C. EVERT,
A. G. HARVEY.